United States Patent

[11] 3,528,342

| [72] | Inventor | David Simcock |
| | | Culcheth, near Warrington, England |
| [21] | Appl. No. | 704,321 |
| [22] | Filed | Feb. 9, 1968 |
| [45] | Patented | Sept. 15, 1970 |
| [73] | Assignee | Gullick Limited |
| | | Wigan, Lancashire, England, |
| | | a British company |

[54] PRESSURE RELIEF VALVE
12 Claims, 4 Drawing Figs.

[52] U.S. Cl. ................................................... 91/468,
137/469, 137/525, 137/535
[51] Int. Cl. ................................................ F16k 17/06
[50] Field of Search ................................. 137/469,
511, 525, 528, 535; 251/61, 61.1; 61/45.2; 91/468

[56] References Cited
UNITED STATES PATENTS

| 2,585,863 | 2/1952 | Smith | 137/469X |
| 2,671,466 | 3/1954 | Conrad | 137/525X |
| 2,847,258 | 8/1958 | Burdick | 251/61X |
| 3,054,420 | 9/1962 | Williams | 137/469 |
| 3,105,507 | 10/1963 | Dunmire | 137/525X |
| 3,371,901 | 3/1968 | Groetschel | 61/45(2)UX |

FOREIGN PATENTS

| 900,153 | 7/1962 | Great Britain | 251/61.1 |

Primary Examiner—Robert G. Nilson
Attorney—Imirie, Smiley, Snyder & Butrum

ABSTRACT: A pressure relief valve has a pressure-fluid flow passage through it and a valve closure member, for a fluid exit end of said passage, is urged thereagainst by a resilient diaphragm which acts on the valve closure member through a deformable body. The diaphragm may be of domed or concave form. The deformable body may be a substantially incompressible solid of such a character that it is not susceptible to temperature changes to the extent that such temperature changes will appreciably upset accurate setting of the valve. Rubber or a synthetic material of rubber-like character is one such solid. Means may be provided in said exit end of said passage to prevent the extrusion of the closure member thereinto. A particular application of the valve is to a hydraulic mine roof support, the valve being connected in a pressure-fluid supply system for a hydraulic prop or props of the support so that hydraulic fluid is bled off from said prop when the load on the support becomes excessive.

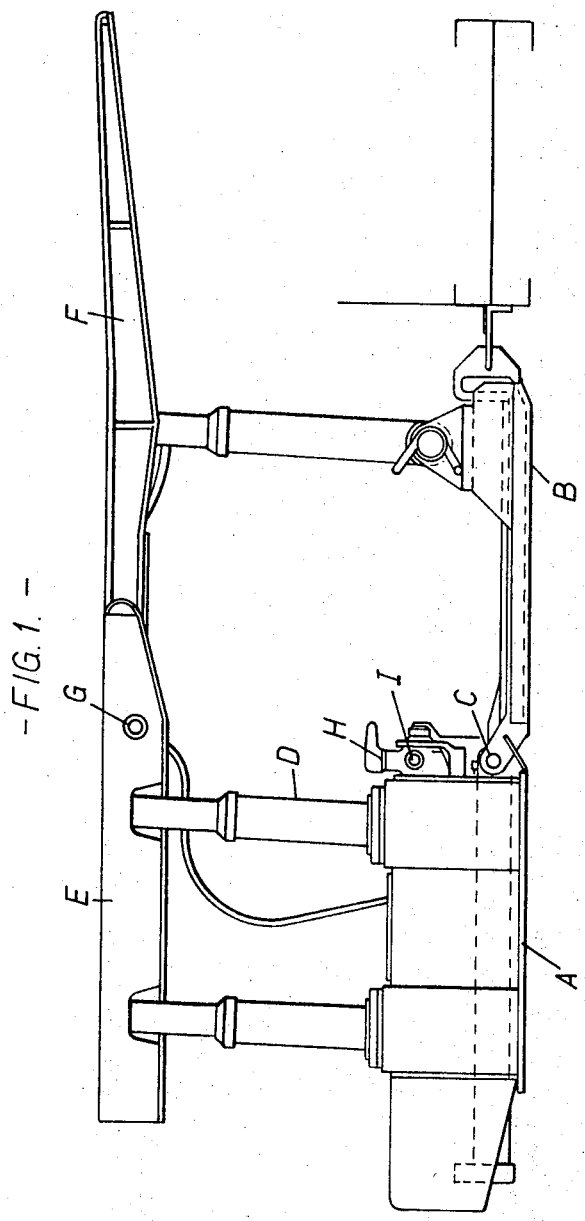

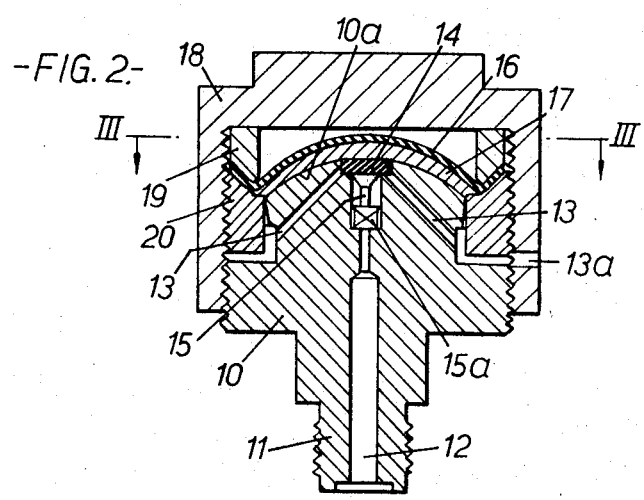
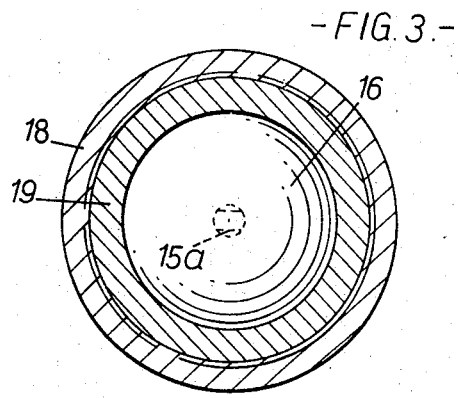
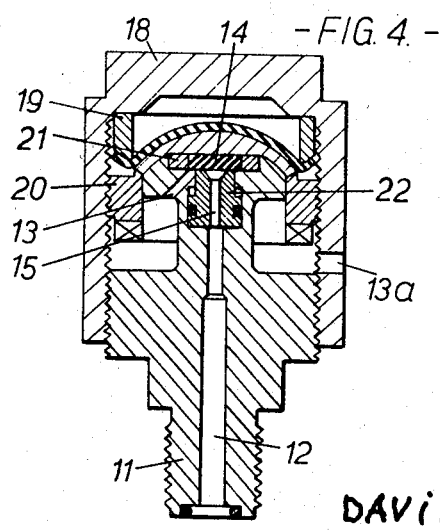

PRESSURE RELIEF VALVE

This invention is for improvements in or relating to fluid-pressure relief valves. Such valves are commonly known as yield or bleed valves.

A typical application of a yield valve is to a hydraulic pit prop or mine roof support. The purpose of the yield valve is to relieve the load on the prop or support when it becomes excessive by bleeding-off a small amount of the hydraulic fluid in the prop or support. Thus, the bleed valve provides control of, for example, roof convergence.

One object of the present invention is to provide a yield valve, the accurate setting of which (i.e. the load at which it will bleed-off pressure-fluid) is not liable to be upset by temperature changes.

According to the present invention there is provided a pressure relief valve having a port and a closure member for said port, wherein said closure member is urged against the port for the closure thereof by a resilient diaphragm or the like which acts on the port closure member through a deformable body.

In preferred embodiments of the invention the diaphragm is of domed form and the deformable body is a substantially incompressible solid (e.g. natural or synthetic rubber or similar material) of such a character that it is not susceptible to temperature changes to the extent that such temperature changes will appreciabley upset the accurate setting of the valve.

The resilient diaphragm may be made, for example, of spring steel, beryllium copper or a resilient plastics material, e.g. resin bonded fibre glass.

Some embodiments of the invention will now be described, by way of example, with reference to the accompanying drawings in which:

FIG. 1 is a side elevation of a hydraulic mine roof support, the hydraulic system of which includes a bleed valve according to the invention;

FIG. 2 is a sectional elevation of the bleed valve;

FIG. 3 is a cross-section on the line III—III of FIG. 2; and

FIG. 4 is a sectional elevation of a modified form of the valve shown in FIGS. 2 and 3.

The roof support shown in FIG. 1 has base members A and B pivotally connected together at C. The base members have mounted on them hydraulically extensible legs or props D which support on their upper part roof-engaging members E and F pivotally connected together at G. The hydraulic pressure-fluid supply system for the legs or props D is provided with a manually-operable control valve H which includes a pressure-fluid relief or yield valve I. This yield valve serves to bleed-off or release a small amount of the hydraulic fluid in the prop or props D of the support should the load on the prop become excessive due, for example, to convergence of the mine roof it supports.

The valve I, which is shown in detail in FIGS. 2 and 3, comprises a body part 10 having a screw-threaded coupling element 11 whereby it may be connected in a hydraulic system, for example, the hydraulic system of the hydraulically extensible telescopic legs D of the self-advancing mine roof support shown in FIG. 1.

The valve body has ports or passageways 12 and 13 through it, communication between said passageways being controlled by a flexible port closure member or disc 14. The port closure member 14 rest on a support 15 which prevents said member extruding into the port or passageway 12.

The support 15 is formed with flats as indicated at 15a so that it does not, when the port closure member 14 is moved to open the valve, prevent the passage of fluid from the port 12 to the bleed or discharge ports 13 and thence to atmosphere via the port 13a.

The port closure member 14 is loaded by means of a spherically dished or domed resilient diaphragm 16 which acts on the valve closure member through a deformable member or pad 17 which transmits the load exerted by the diaphragm 16 to the valve closure member 14. The pad 17 is partially supported by the domed or concave face 10a of the body part 10.

A casing 18 for the valve is screwed onto the body part 10.

The diaphragm 16 is held or clamped in position by means of rings 19 and 20 screwed into the casing 18 and having conical faces which engage the out-turned rim of the diaphragm.

The valve is adjusted or set to the pressure at which fluid will be released from the port 12 by screwing the body part 10 further into or out of the casing 18. This pre-stresses the resilient diaphragm 16, more or less, through the deformable body 17 and loads the diaphragm 16 to the required extent.

In use the port 12 of the valve is connected to the hydraulic system of the roof support by means of the coupling element 11. During the natural convergence of the roof pressure builds up in the hydraulic system of the support. This in turn exerts a load on the valve closure member 14 and at a predetermined excessive load the member 14 lifts from its support 15 and pressure-fluid is allowed to escape or bleed-off via the ports 12 and 13 to atmosphere. Lifting of the port closure member 14 causes a force to be transmitted through the deformable body 17 to the pre-stressed diaphragm 16. When sufficient pressure has been released via the ports 12 and 13 the valve closure member 14 is re-seated, so as to close the port 12, under the influence of the resilient diaphragm 16.

The diaphragm 16 may be bonded to the conical ring 19 or 20 and similarly the deformable body 17 may be bonded to the upper spherical face of the body part 10.

Preferably the deformable body or member 17 is a substantially incompressible solid but it may be a liquid. It is not essential, however, that the deformable body should be substantially incompressible. It may have a degree of compressibility and be resilient so that it will contribute to the loading of the port closure member.

The deformable body of member 17 should have a temperature coefficient such that it is not readily susceptible to temperature changes, otherwise the accurate setting of the valve may be upset.

By making the resilient diaphragm 16 of domed or concave form a more even distribution of load on the valve is obtained, but in some cases a flat diaphragm may be used.

In some cases the deformable body 17 may also serve the port closure member, the separate element 14 being omitted.

The yield valve shown in FIG. 4 is similar in some respects to already described with reference to FIGS. 2 and 3 and where applicable like reference numerals have been used to designate like parts.

The valve closure member 14 in the valve shown in FIG. 4 is provided with a rim 21 of metal or other rigid material and works in conjunction with a floating valve seat 22.

The member 15 which prevents extrusion of the relatively soft valve closure member 14 into the pressure release orifice or port of the valve is in the form of a simple mushroom-shaped member, the stem of which is a loose fit in the floating valve seat 22 so that when fluid-pressure at the inlet 12, to the valve, becomes excessive pressure-fluid can escape via the bore of the floating valve seat 22, under the port closure member 14 and deformable member or pad 17 and into the interior of the casing 18 from which it escapes to atmosphere.

I claim:

1. A pressure relief valve comprising a body part having through it a pressure-fluid flow passage, a valve closure member operative to close a fluid exit end of said passage, a resilient diaphragm, a deformable body positioned between said valve closure member and said resilient diaphragm, the latter acting through the deformable body on the valve closure member to urge it against said fluid exit end of said passage, and a casing secured to and over the body part and housing the resilient diaphragm, said body part being adjustably secured in said casing and serves to pre-stress the resilient diaphragm through the deformable body and thereby load the diaphragm to a predetermined degree.

2. A relief valve as claimed in claim 1 wherein the diaphragm is of domed form.

3. A relief valve as claimed in claim 1 wherein the deformable body is a substantially incompressible solid of such a character that it is not susceptible to temperature changes to the extent that such temperature changes will appreciably upset the accurate setting of the valve.

4. A relief valve as claimed in claim 3 wherein the deformable body is of the character of rubber.

5. A relieve valve as claimed in claim 1 wherein the deformable body is supported by a dome-shaped face of the body part.

6. A relief valve as claimed in claim 1 wherein means is provided in said exit end of said passage to prevent extrusion of the closure member thereinto.

7. A relief valve as claimed in claim 1 wherein the resilient diaphragm is of domed form and has an angled peripheral flange which is clamped between clamping members.

8. A relief valve as claimed in claim 1 wherein a floating valve seat is provided for the valve closure member, the pressure-fluid flow passage passing through said floating valve seat.

9. A relief valve as claimed in claim 1 wherein the deformable body has a degree of resiliency so that it contributes to the loading of the valve.

10. A pressure relief valve as claimed in claim 1 wherein the body part is screwed into said casing.

11. A hydraulic mine roof support having hydraulic prop means and a pressure-fluid supply system therefor wherein said pressure-fluid supply system includes a pressure-fluid relief valve comprising a body part having through it a pressure-fluid flow passage, a valve closure member operative to close a fluid exit end of said passage, a resilient diaphragm, a deformable body positioned between said valve closure member and said resilient diaphragm, the latter acting through the deformable body on the valve closure member to urge it against said fluid exit end of said passage, and a casing secured to and over the body part and housing the resilient diaphragm, said body part being adjustably secured in said casing and serves to pre-stress the resilient diaphragm through the deformable body and thereby load the diaphragm to a predetermined degree.

12. A hydraulic mine roof support as claimed in claim 11 wherein the body part of the valve is screwed into said casing thereof.